Nov. 10, 1925.
T. J. FAY
1,561,221
VEHICLE CONSTRUCTION
Filed Sept. 15, 1923  3 Sheets-Sheet 1
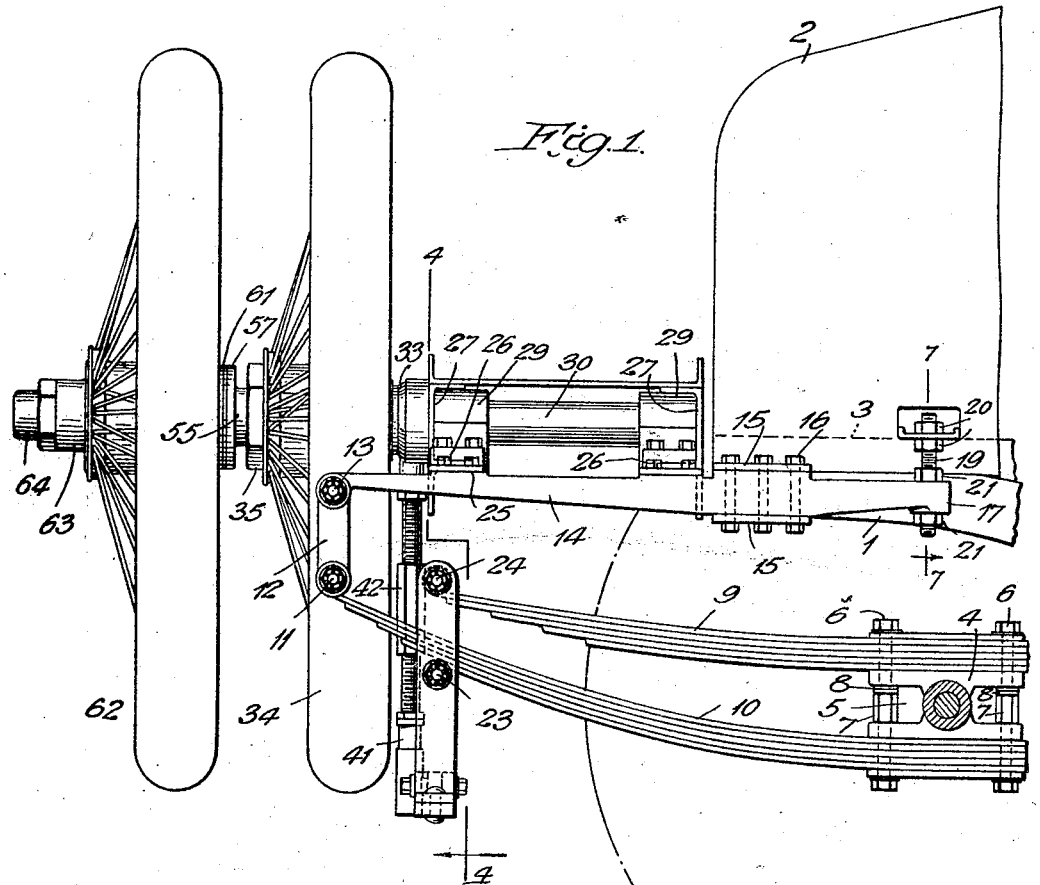
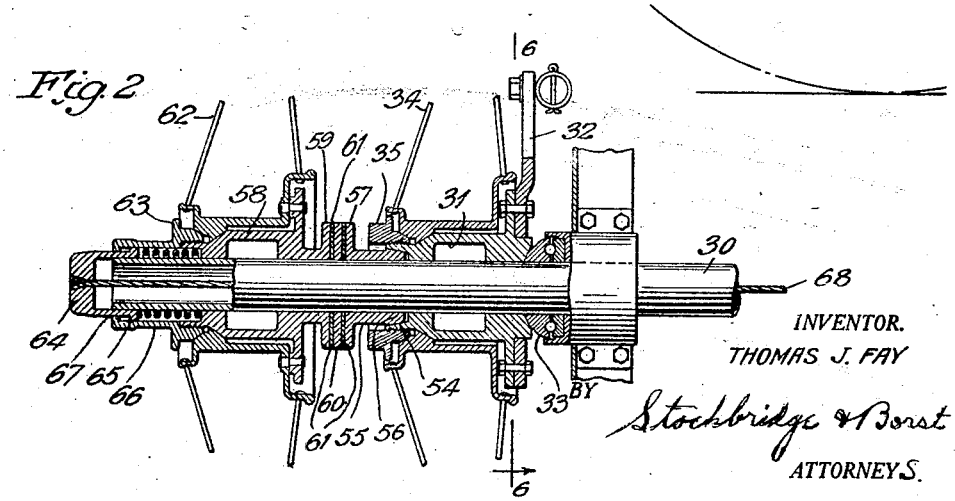
INVENTOR.
THOMAS J. FAY
Stockbridge & Borst
ATTORNEYS.

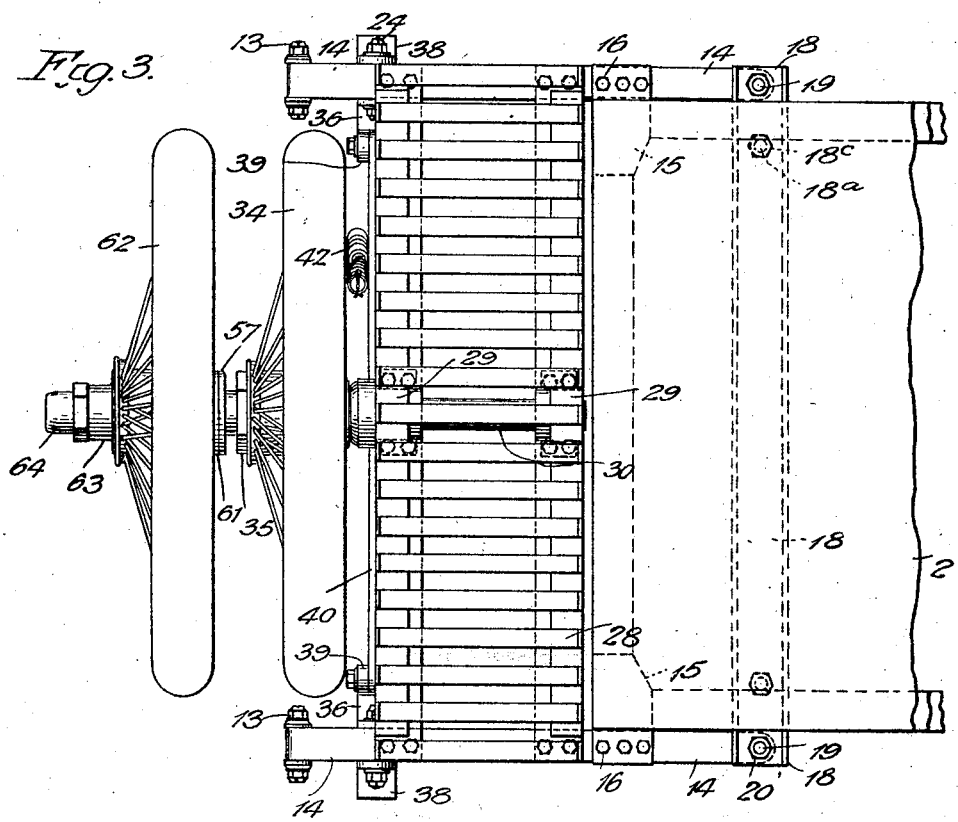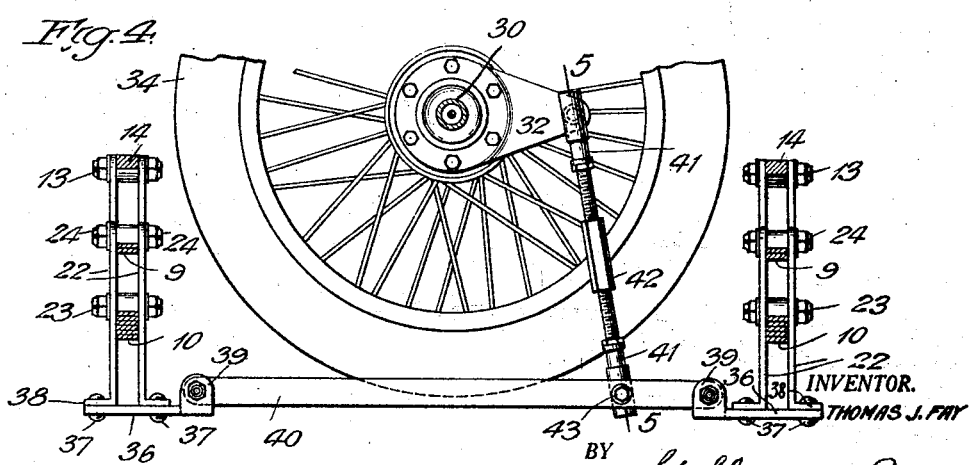

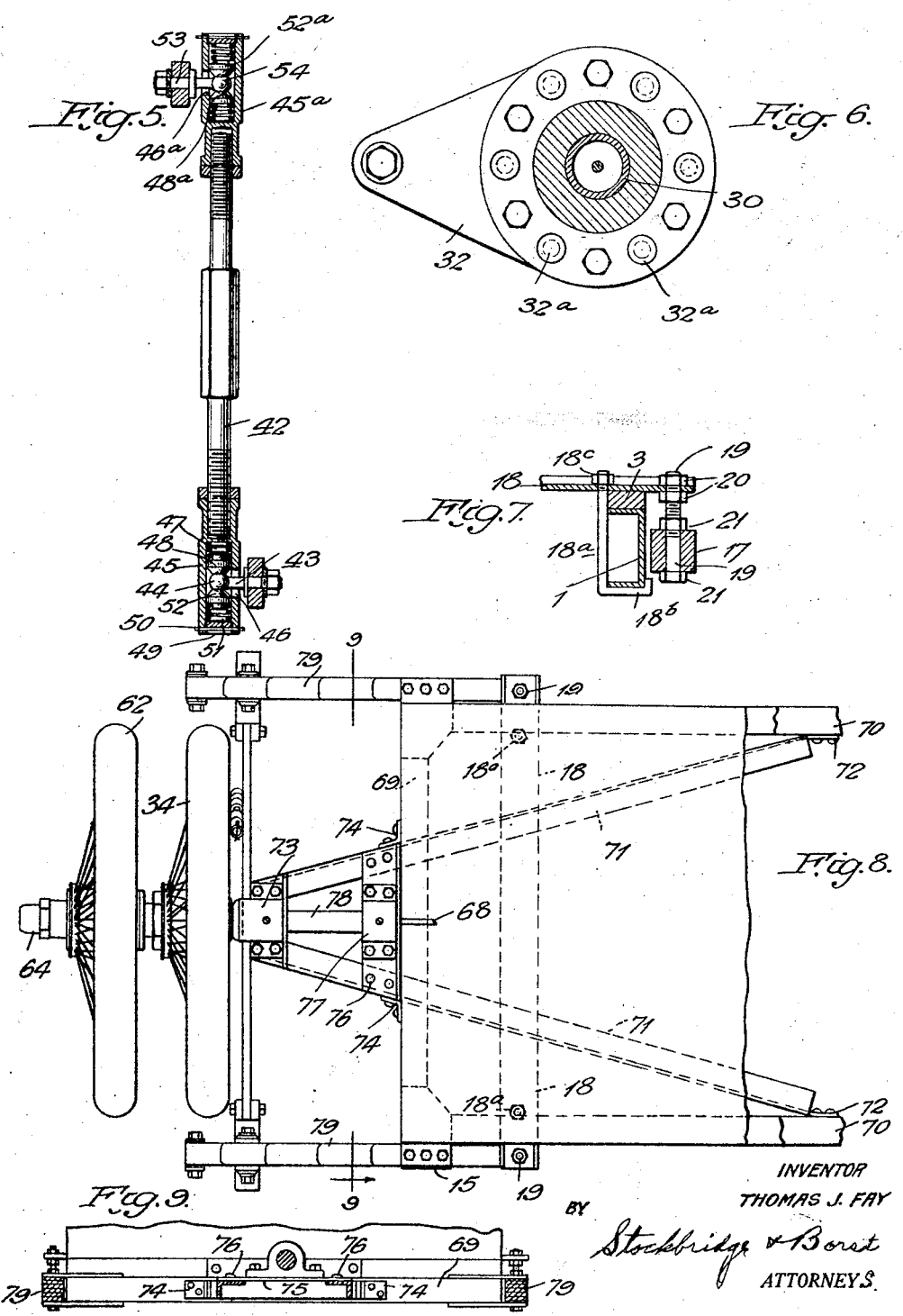

Patented Nov. 10, 1925.

1,561,221

UNITED STATES PATENT OFFICE.

THOMAS J. FAY, OF BROOKLYN, NEW YORK.

VEHICLE CONSTRUCTION.

Application filed September 15, 1923. Serial No. 662,857.

*To all whom it may concern:*

Be it known that I, THOMAS J. FAY, a citizen of the United States, residing at Brooklyn, in the county of Kings and State of New York, have invented certain new and useful Improvements in Vehicle Constructions, of which the following is a full, clear, and exact description.

This invention relates to vehicles, and particularly to the suspension between the axles and chassis frame. An object of the invention is to provide an improved vehicle construction in which the spring suspension device between the chassis frame and axles on opposite sides of the vehicle may be adjusted to correct sagging on either side and thus maintain the chassis frame level; in which the suspension device may be attached to the axle with the desired and variable tightness, so as to avoid looseness and to prevent danger of injury to the axle shell by gripping it too tightly; and in which the relative motion between an axle and chassis frame will be effectively controlled in a manner to improve the riding qualities of the vehicle by preventing jouncing and bouncing of its occupants due to the unevenness of the roadway, especially when the vehicle is moving with considerable speed. A further object is to provide a structure for accomplishing the above objects which can be employed in existing types of vehicles in a simple manner and without material changes in their design. Other objects and advantages will be apparent from the following description of an embodiment of the invention, and the novel features will be particularly pointed out hereinafter in claims:

In the accompanying drawings:

Fig. 1 is an elevation partly in section of the rear end of an automobile in which the invention is embodied;

Fig. 2 is a horizontal section through the spare wheels and their support;

Fig. 3 is a plan of the rear end of the automobile shown in Figure 1;

Fig. 4 is a sectional elevation of the same, taken substantially along the line 4—4 of Fig. 1;

Fig. 5 is a sectional elevation of a portion of the shock absorbing or controlling mechanism taken substantially along the line 5—5 of Fig. 4;

Fig. 6 is a section through the spare wheel support taken substantially along the line 6—6 of Fig. 2;

Fig. 7 is a section through the rear end of the chassis frame taken substantially along the line 7—7 of Fig. 1;

Fig. 8 is a plan of the rear end of an automobile constructed in accordance with the invention, but illustrating a modification; and Fig. 9 is a sectional elevation of the same, taken along the line 9—9 of Fig. 8.

Referring particularly to Figs. 1 to 7, the vehicle comprises a chassis frame 1, mounting a vehicle body 2 which is provided with a suitable sill 3 that rests upon the chassis frame. A pair of clamping blocks 4 are caused to embrace the shell 5 of the rear axle at each side of the chassis frame, and the clamping blocks are secured together, in a clamped relation to the shell of the rear axle, by suitable spacer-bolts 6. The clamping blocks 4, when in embraced relation with the rear axle shell, are not in contact with one another and the spacer-bolts 6 are provided with integral heads 7, intermediate of their ends, which are interposed between the abutting faces of the clamping blocks so as to limit the approach of the blocks and thereby the extent of their clamping action upon the rear axle shell. Suitable washers 8 may be interposed on the spacer-bolt between the heads 7 and one of the clamping blocks, so as to limit the adjustment of the blocks toward or from one another, when the nuts carried by the ends of the spacer-bolts are tightened; until they exert the desired pressure upon the axle shell. The adjustment is secured by adding or removing washers 8 until the effective lengths of the heads 7 of the bolts produce the desired spacing of the clamping blocks. It is desirable that the clamping blocks fit fairly tightly upon the axle shell, but not tight enough to produce undue stress in the shell.

A pair of spring devices 9 and 10 are clamped against the outer face of each pair of clamping blocks, and secured thereto on opposite sides of the rear axle by the spacer-bolts 6 which also secure the bearing blocks to the axle. Each of the upper spring devices 9 extends forwardly from the axle and has a suitable articulated connection with the chassis frame, and also extends rearwardly of the axle for some distance. The spring devices 10 extend only from the bearing blocks rearwardly, but to a greater extent than the spring devices 9. The spring devices, as illustrated, are each composed of a plurality of superposed leaf springs, which terminate progressively at different distances from the outer ends. The upper leaf of each of the lower spring devices 10 extends furthest from the rear axle and terminates in an eye. A pin 11 passes through the eye and serves to articulately connect thereto one end of a pair of links 12, the links 12 being articulately connected at their other ends by a pin 13, to the rear end of an upper extension or suspension member 14.

A pair of plates 15 extend transversely across the rear end of the chassis frame, and above and below it in superposed relation to one another, the plates 15 extending outwardly beyond the sides of the chassis frame to embrace intermediate portions of the extension members 14 which are disposed along the outer side faces of the chassis frame. Suitable fastening means, such as bolts 16, pass through the plates 15 and through the extension members 14 so as to anchor the extension members securely to the chassis frame. The extension members extend forwardly beyond the plates 15 and terminate in eyes 17 having vertical passages therethrough.

A plate 18 extends transversely of the body 2 and outwardly through the sides thereof, directly over and in contact with the sill 3 of the body, as illustrated in Figures 1 and 3. The plate 18 is secured to the frame and body in any suitable manner such as by bolts 18$^a$ (see Fig. 7) which have hooked ends 18$^b$ engaging beneath the side members of the chassis frame, and passing upwardly through the plates 18, with nuts 18$^c$ on the upper ends. The nuts 18$^c$ when tightened securely clamp together the plate 18, the body sill, and the chassis frame and serve to anchor the vehicle body to the chassis frame. Bolts 19 are secured, by opposing nuts 20, adjustably to the plate 18, the bolts extending downwardly through the vertical apertures in the eyes 17 of the extension members, suitable opposing nuts 21 being provided upon each bolt on opposite sides of the eye for adjustably clamping the eye to the bolt which passes through it. By suitable operation of the nuts 20 or 21, the forward ends of the extension members 14 may be operated to a limited extent vertically, the plates 15 flexing to a slight extent to permit of this vertical movement. This vertical movement of the forward ends of the extension members will produce an opposite movement of the rear ends, and through this movement the normal elevation of the chassis frame above the axle at each side may be adjusted independently of the other side. This enables suitable correction to be made for unequal sagging of the body at either side of the vehicle.

The lower leaf of each spring device 10 is disposed between a pair of gathering plates 22. A pin 23 passes through aligned apertures in each pair of the gathering plates and through the interposed terminal eye of the lower leaf of the spring device 10. The upper leaf of each spring device 9 terminates in an eye, also disposed between the pair of gathering plates which embrace the lower spring device 10 on that side of the vehicle. A pin 24, similar to the pin 23, passes through the interposed eye of the spring device 9 and through aligned apertures in the gathering plates 22, so that each pair of gathering plates will form a rigid connection between the embraced superposed spring devices 9 and 10, adjacent their rear ends.

The apertures in the gathering plates 22 through which the pivot bolts 23 and 24 pass are preferably located with a distance between them less than the normal distance between the eyes of the leaf springs to which they are connected, so that it will be necessary to flex the superposed spring devices 9 and 10 toward one another in order to couple them to the gathering plates. I have found that, it is desirable, to so locate the connections of the spring devices to the gathering plates, as to create between the superposed spring devices an initial or normal stress of approximately 800 pounds, but it will be understood that this stress is merely an illustration of a satisfactory degree of stress between the spring device, and that various other degrees of stress may also be used within the principle of the invention.

With this construction of the suspension between the axle and chassis frame the flexure of the spring devices of the suspension, during the minor relative movements between the axle and chassis frame, will occur largely in the forward extensions of the upper spring devices 9, and in the rearward extensions of the lower spring devices 10, rearwardly of their connection to the gathering plates. The flexure in the main body of the rearward extensions of the spring devices 9 and 10 will occur only during the more violent or excessive movements between the chassis frame and axle. It will be understood, however, that, if desired, the extension members 14 may also be made resilient, such as by constructing them of superposed leaf spring similar to the spring devices 9 and 10.

Angle plates 25 are disposed transversely of the vehicle so as to connect the extension members 14 on opposite sides of the vehicle, and rearwardly of the body 2. The depending flanges of the angle members may be notched sufficiently to allow the horizontal sections to overlie the upper surface of the extension members. These angle plates 25 may be secured to the extension members 14 in spaced relation to one another, rearwardly of the vehicle, in any suitable manner such as by bolts 26 which pass through the angle plates and into the extension members. Channel members 27 are mounted, preferably edgewise, upon the horizontal sections of the angle plates 25, so as to extend transversely of the vehicle. The channel plates 27 may be secured to the angle plates 25 in any suitable manner, and the upper edges of the channels serve as a support for slats 28, which extend lengthwise of the vehicle and form a platform or rack for the support of baggage.

Midway between the extension members 14 aligned bearing blocks 29 are supported upon the angle plates 25, the lower edges of the channel plates 27 being notched in order to clear the bearing blocks. A shaft 30 is supported by and held against rotation in the aligned bearing blocks 29, and extends rearwardly from the baggage rack to some extent. A wheel hub 31 is rotatably mounted upon the rearward extension of the shaft 30 and carries a crank arm 32. A thrust bearing device 33 (see Fig. 2) is interposed between the hub 31 and the rearmost bearing block 29. A spare demountable wheel 34 is carried by the hub 31, being held thereon by a suitable cap 35, and against rotation relatively thereto by pins 32ª carried by a flange of the hub and adapted to enter apertures in the wheel when the latter is mounted upon the hub.

Plates 36 (see Fig. 4) are secured, in any suitable manner such as by rivets 37, to flanges 38 on the lower end of each pair of anchoring plates, and each plate 36 is provided with an upturned ear 39. A bar 40 extends between and connects the upstanding ears 39. A connecting rod 41 is connected at one end to the cross bar 40 by means of a suitable universal connection, and at its other end by a similar universal connection to the crank arm 32. The connecting rod preferably includes therein a turn buckle movement 42, by means of which its effective length between the universal connections may be varied at will.

From this construction, it will be observed that when relative movements occur between the chassis frame and rear axle, the spare wheel 34 will be oscillated owing to the fact that it is bodily carried by the chassis frame and connected through the crank arm 32 and connecting rod 41, to the gathering plates which form a comparatively stiff extension of the rear axle. The inertia of the wheel will therefore act to retard the relative movements between the axle and chassis frame, with the result that the relative movements will be less rapid and extensive.

The construction of the connecting rod and its universal connections between the crank arm 32 and the bar 40 is clearly illustrated in Fig. 5. The bar 40 is provided with a pin 43 which terminates at its outer end in a ball 44. A sleeve 45 is provided with a longitudinally extending slot 46 through which the pin 43 extends so as to position the ball 44 within the sleeve. A compression spring 47 acts against a shoulder of the sleeve and yieldingly stresses a piston 48 against one side of the ball 44, the piston having, in its face contacting with the ball, a cavity of substantially the curvature of the ball. A removable head 49 is provided in the lower end of the sleeve 45, being threaded therein, and locked by a pin 50 which passes through both the removable head and the sleeve. A spring 51, similar to the spring 47, acts between the removable head 49 and a piston 52 to carry the latter against the side of the ball 44 opposite the piston 48, the piston 52 having in its surface engaging the ball a cavity of substantially the curvature of the ball. The intermediate section of the connecting rod, which is designated by the reference character 42, comprises a rod which is threaded into the upper end of the sleeve 45. The upper end of this rod is threaded into the lower end of a sleeve 45ª similar to the sleeve 45.

A pin 53 is carried by the crank arm 32 and terminates at its free end in a ball 54, similar to the ball 44 of the pin 43. The pin 53 passes into the sleeve 45ª through an aperture 46ª and is engaged on opposite sides by pistons 48ª and 52ª which are spring pressed toward one another in a manner similar to that disclosed in connection with pistons 48 and 52. With this arrangement the effective length of the connecting rod may be varied by merely turning the central portion of the rod, and whenever stresses are transmitted between the pins 43 and 53, they will be cushioned somewhat by the action of the spring pressed pistons which serve as a connection between the rod and the pins.

The cap 35 (see Fig. 2) which secures the spare wheel 34 to the bearing plug, 31, is made annular in shape and the inner end face of the hub 31 is recessed with a slightly conical peripheral wall 54. A sleeve 55 is mounted rotatably upon the outer end of the shaft 30, and has a tapered end 56 adapted to enter and have clutching engagement with the conical recess wall 54, so that whenever the hub 31 rotates, the sleeve 55 will be rotated therewith. The rear end of the sleeve 55 is provided with a peripheral flange 57.

A second bearing hub 58 is rotatably mounted upon the rear end of the shaft 30, and is provided at its forward end with a peripheral flange 59 which is adapted to abut against the peripheral flange 57 of the sleeve 55. A suitable friction washer 60 lined on opposite faces with friction lining 61, is mounted loosely upon the shaft 30 between the flanges 57 and 59. A second demountable wheel 62 is removably carried by the hub 58 and connected for rotation therewith, the spare wheel being held against removal from the hub by a suitable retaining cap 63.

A cap 64 is mounted upon the extreme rear end of the shaft 30, with a sleeve-like extension embracing the shaft for some distance, and having at its inner end an outer peripheral flange 65. The sleeve-like extension of the cap 64 is slidable within a tubular extension of the cap 63. A compression spring 66 is disposed within the tubular extension of the retaining cap 63, and is compressed between an end face of the hub 58 and the inner end of the cap 64, so as to constantly press the cap 64 outwardly, the outward movement of the cap being limited by the engagement of its peripheral flange 65 with an internal annular flange 67, provided at the extreme rear end of the tubular extension of the retaining cap 63.

A suitable cable or link 68 extends through the shaft 30, which is hollow, and is connected to the cap 64, so that when the link of cable 68 is drawn forwardly through the shaft 30, the cap 64 will be drawn to a greater extent over the shaft 30 and act through the compression spring 66 to stress the hub 58 forwardly and against the flange 57 which is clutched to the hub 31. The friction between the flanges 57 and 59 will, therefore, be dependent upon the initial compression of the spring 66 and the extent to which the link or cable 68 is drawn forwardly through the shaft 30, and this friction between the flanges 57 and 59 determines the frictional driving force between the two spare wheels 34 and 62. The link or cable 68 is carried forwardly and connected to a suitable operating mechanism within convenient accessibility of the driver of the vehicle.

In Figs. 8 and 9, a modified embodiment of the invention is illustrated. In this embodiment, the rear end 69 of the chassis frame 70 is centrally apertured for the passage of angle members 71, the angle members being secured in any suitable manner, such as by rivets 72 to intermediate portions of the side members of the chassis frame, and disposed convergently relatively to one another in a rearward direction, the convergent ends being connected to a suitable bearing block or support 73 at a point outside of the chassis frame. The angle members 71 are connected to the rear cross member 69 of the chassis frame by suitable connecting angle members 74. An angle member 75 extends over the angle members 71 as they emerge from the chassis frame and is suitably connected thereto, such as by rivets 76. A second bearing block 77 is mounted upon the angle member 75 in alignment with the bearing block or support 73, and together the bearing blocks or supports 73 and 77 rigidly support a shaft 78 which extends rearwardly of the bearing support 73.

The suspension between the chassis frame and the axle may be similar to that illustrated and described in connection with Figs. 1 to 7, but the extension members 79, corresponding to the members 14, are illustrated as spring devices, each composed of superposed leaf springs. Spare wheels 34 and 62 are carried by the shaft 78 for operation from the suspension device in a similar manner to that described in connection with Figs. 1 to 7, the corresponding parts being designated by the same numerals.

In the use of the vehicle constructed in this manner, the spring devices 9 and 10 may be secured to the shell of the rear axle sufficiently tight to prevent noise due to lost motion, and without danger of clamping so tightly as to fracture, spring, or otherwise injure the shell of the axle. The nuts 20 or 21 at each side of the vehicle may be adjusted so as to rock the extension members 14 in a vertical plane to a limited extent, and thereby level up the vehicle body relatively to the axle and compensate for any sag which might occur in the suspension device at either side of the vehicle.

As the vehicle moves over a roadway, the minor relative movements between the axle and the chassis frame will be taken up in the forward extensions of the spring devices 9, and in the stretches of the spring devices 10 between their connection to the gathering plates and the links 12, which connect them to the extension members 14. During the more extensive relative movements between the axle and chassis frame, such as may occur when the vehicle passes over an exceptionally uneven roadway, some of the movement will be taken up by flexure of the spring devices 9 and 10 rearwardly of the axle.

In all of the movements the crank action between the comparatively rigid portion of the connected spring devices 9 and 10 and the forward spare wheel 34, will result in an oscillation of this spare wheel in accordance with the relative movements of the body and axle. This spare wheel, due to its inertia, will act to retard or slow up the relative movements between the chassis frame and axle and thus prevent bouncing and jouncing of the chassis frame. The second spare wheel, owing to its frictional driving connection with the forward spare wheel will act as a drag thereon, and add its inertia through a frictional driving connection to the inertia of the forward wheel. This results in a more uniform modulation or checking of the relative movements between the frame and axle, with resulting exceptional smoothness in the riding qualities of the vehicle. The operator of the vehicle, by drawing upon the link or cable 68 to greater or less extents, may vary the pressure in the frictional connection between the two spare wheels, and thus to some extent vary the dragging effect that the second or rearmost spare wheel will exert upon the other spare wheel which is more positively connected for operation during relative movements of the chassis frame and axle. In the event that punctures occur in the tires supporting the vehicle, it is a simple matter to substitute the spare tires of the spare wheels for the punctured tires, or the spare wheels may be readily interchanged with the wheels supporting the vehicle. The extension members also serve as supports for a baggage rack which may, if desired, be provided at the rear of the chassis frame.

The bolts 19 which adjustably anchor the inner ends of the extension members to the chassis frame, are within the portion covered by the wheels, so that access to these bolts for adjustment in leveling up the body of the vehicle, may be readily obtained by the mere removal of the vehicle supporting wheel at the side where the adjustment is to be made. It will also be observed that little modification in existing types of vehicles is necessary in applying the invention thereto.

It will be obvious that various changes in the details and arrangements of parts, herein described and illustrated for the purpose of explaining the nature of the invention, may be made by those skilled in the art within the principle and scope of the invention as expressed in the appended claims.

I claim:

1. In a construction for vehicles having a body part and a running gear part which are adapted to approach and separate relatively to one another as the vehicle travels over a roadway, a stabilizer comprising a pair of inertia elements mounted upon one of said parts for movement relative thereto and to one another and a connection between one of the elements and the other of the parts for effecting a movement of the connected element upon a relative movement between the said parts, said elements having between them a yieldable connection for causing a yielding dragging action of the element that is unconnected to said parts upon the other element.

2. In a construction for vehicles having a body part and a running gear part which are adapted to approach and separate relatively to one another as the vehicle travels over a roadway, a stabilizer comprising a pair of inertia elements mounted upon one of said parts for movement relative thereto and to one another, and a connection between one of the elements and the other of the parts for effecting a movement of the connected element upon a relative movement between the said parts, said elements having a frictional driving connection between them for causing a frictional dragging action of the element that is unconnected to said parts upon the other element.

3. In a construction for vehicles having a body part and a running gear part which are adapted to approach and separate relatively to one another as the vehicle travels over a roadway, a stabilizer comprising a pair of inertia elements mounted upon one of said parts for movement relative thereto and to one another, a connection between one of the elements and the other of the parts for effecting a movement of the connected element upon a relative movement between the said parts, said elements having a frictional driving connection between them for casing a frictional dragging action of the element that is unconnected to said parts upon the other element and means for varying the friction between the elements.

4. In a construction for vehicles having a body part and a part moving vertically with the axle, relatively to the body part, a stabilizer comprising a shaft carried by and extending rearwardly of the body part, a pair of inertia elements rotatably mounted on said shaft, and a crank connection between one of the inertia elements and the part moving vertically with the axle for causing oscillation of said one element during relative movement between said parts, said elements having between them a yieldable connection for causing a dragging action between the elements, the other of said elements being freely rotatable on said shaft except for its said yieldable connection to the said one of the elements.

5. In a construction for vehicles having a body part and a part moving vertically with the axle, relatively to the body part, a stabilizer comprising a shaft carried by and extending rearwardly of the body part, a pair of inertia elements rotatably mounted on said shaft, and a crank connection between one of the inertia elements and the part moving vertically with the axle for causing oscillation of said one element during relative movement between said parts, said elements having between them a frictional connection for causing a dragging action between the elements, the other of said elements being freely rotatable on said shaft except for its said frictional connection to said one of the elements.

6. In a construction for vehicles having a body part and a part moving vertically with the axle, relatively to the body part, a stabilizer comprising a shaft carried by and extending rearwardly of the body part, a pair of inertia elements rotatably mounted on said shaft, a crank connection between one of the inertia elements and the part moving vertically with the axle for causing oscillation of said one element during relative movement between said parts, said elements having between them a frictional connection for causing a dragging action between the elements, the other of said elements being freely rotatable on said shaft except for its said frictional connection to said one of the elements, and means for varying the degree of friction between the elements.

7. In a vehicle having a chassis frame and an axle, plate elements extending laterally from the sides of the frame, extension members secured to said plate elements so as to extend endwise from the frame and for a short distance along the side of the frame, suspension elements secured to the axle and extending endwise of the frame below the extension members, each set of superposed suspension elements and extension members being articulately connected at their outer ends, and vertically adjustable connections between the frame and the inner ends of the extension members whereby by varying the adjustable connections, the extension members may be rocked vertically about their connections to the plates, so as to vary the spacing between the frame and the axle at each side independently of the spacing of the others.

8. In a vehicle having a chassis frame and an axle, plate elements extending laterally from the sides of the frame, extension members secured to said plate elements so as to extend endwise from the frame and for a short distance along the side of the frame, suspension elements secured to the axle and extending endwise of the frame below the extension members, each set of superposed suspension elements and extension members being articulately connected at their outer ends, a vehicle body having a sill resting on said frame, a strap element passing over the sill and extending from opposite sides of the frame, means for anchoring the strap element to the frame, and vertically adjustable connection between the extending ends of the strap element and the inner ends of the extension members whereby by varying the adjustable connections, the extension members may be rocked vertically about their connections to the plates, so as to vary the spacing between the frame and the axle at each side independently of the spacing of the others.

9. A vehicle construction comprising a chassis frame and an axle, extension members secured to the side of the chassis frame to extend rearwardly therefrom, suspension elements secured to the axle to extend rearwardly therefrom and articulately connected to the rear ends of the extension members, cross members connecting the portions of the extension members in the rear of the chassis frame, a shaft supported by the cross members and extending rearwardly from the chassis frame, an inertia element mounted on said shaft, and means for oscillating said inertia element when the axle and chassis frame approach and separate relatively to one another.

10. A vehicle construction comprising a chassis frame and an axle, extension members secured to the side of the chassis frame to extend rearwardly therefrom, suspension elements secured to the axle to extend rearwardly therefrom and articulately connected to the rear ends of the extension members, cross members connecting the portions of the extension members in the rear of the chassis frame, a shaft supported by the cross members and extending rearwardly from the chassis frame, an inertia element mounted on said shaft, means for oscillating said inertia element when the axle and chassis frame approach and separate relatively to one another, and a baggage rack supported by the extension members between the inertia element and the chassis frame.

11. A vehicle construction comprising a chassis frame and an axle, extension members secured to the side of the chassis frame to extend rearwardly therefrom, suspension elements secured to the axle to extend rearwardly therefrom and articulately connected to the rear ends of the extension members, cross members connecting the portions of the extension members, in the rear of the chassis frame, a shaft supported by the cross members and extending rearwardly from the chassis frame, an inertia element mounted on said shaft, and a crank connection between the inertia element and said extension members whereby the relative approach and separation of the axle and chassis frame will produce oscillations of the inertia element.

12. In a construction for vehicles having parts which approach and separate as the vehicle travels over an uneven roadway, a stabilizer comprising a pair of inertia elements supported by one of said parts and capable of rotation relatively thereto, and independently of one another, crank means connecting one of the inertia elements to the other of said parts for causing an oscillation of this element when the parts approach and separate, said inertia elements having a frictional drive between them, the other of said inertia elements being unconnected to either of said parts except through its support for rotation and its said frictional drive from the said one of the elements and means for effecting selective variable degrees of pressure in the frictional drive between the elements whereby the drag of one inertia element upon the other may be varied at will.

13. In a construction for vehicles having a chassis frame and an axle, a stabilizer comprising a shaft, means for supporting said shaft from the chassis frame, a pair of rotatable inertia elements carried by said shaft and having frictional abutting faces, said elements being capable of relative movement toward and from one another along the shaft, means for oscillating one of said inertia elements as the axle and frame approach and separate, the other element being independently rotatable and means for pressing said elements together with selective variable pressure whereby the drag of one element upon the oscillated one may be varied at will.

14. In a construction for vehicles having a chassis frame and an axle, a stabilizer comprising a shaft, means for supporting said shaft from the chassis frame, a pair of rotatable inertia elements carried by said shaft and having frictional abutting faces, said elements being capable of relative movement toward and from one another along the shaft, means for oscillating one of said inertia elements as the axle and frame approach and separate, and means including a tension member passing through the shaft for pressing said elements together with selective variable pressure whereby the drag of one element upon the oscillated one may be varied at will by varying the tension on said tension member.

15. In a construction for vehicles having a chassis frame and a rear axle, the suspension device comprising extension members secured to the side of the chassis frame and extending rearwardly therefrom, superposed leaf spring devices clamped together below each extension member and secured to the axle, the spring devices extending rearwardly from the axle in vertically spaced relation, comparatively rigid means connecting together the rear end portions of the spring devices of each pair with the rear ends of the devices of each pair sprung toward one another, the sprung-together ends of each pair having an articulated connection to the overlying rear end of an extension member, one of the spring devices extending forwardly from the axle and having a connection to the chassis frame, a cross piece connecting the rigid means at each side of the frame, an inertia element mounted for bodily movement with the chassis frame and also movable relatively thereto, and a connection between the inertia element and the cross piece for causing movement of the inertia element upon approach or separation of the axle and frame.

In witness whereof, I hereunto subscribe my signature.

THOMAS J. FAY.